United States Patent
Nishikawa

(10) Patent No.: US 10,640,662 B2
(45) Date of Patent: *May 5, 2020

(54) DISPERSANT, DISPERSION, INK COMPOSITION, AND METHODS OF PREPARATION THEREOF

(71) Applicant: Nissin Chemical Industry Co., Ltd., Echizen-shi, Fukui-ken (JP)

(72) Inventor: Tomoyuki Nishikawa, Echizen (JP)

(73) Assignee: NISSIN CHEMICAL INDUSTRY CO., LTD., Echizen-Shi (JP)

( * ) Notice: Subject to any disclaimer, the term of this patent is extended or adjusted under 35 U.S.C. 154(b) by 302 days.

This patent is subject to a terminal disclaimer.

(21) Appl. No.: 15/797,622

(22) Filed: Oct. 30, 2017

(65) Prior Publication Data

US 2018/0118961 A1    May 3, 2018

(30) Foreign Application Priority Data

Oct. 31, 2016    (JP) .................................. 2016-212792

(51) Int. Cl.
| | | |
|---|---|---|
| *C09D 11/03* | (2014.01) | |
| *C09D 11/16* | (2014.01) | |
| *C09D 11/38* | (2014.01) | |
| *C09D 11/037* | (2014.01) | |
| *C09D 11/322* | (2014.01) | |
| *C09D 11/328* | (2014.01) | |

(52) U.S. Cl.
CPC .............. *C09D 11/03* (2013.01); *C09D 11/16* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 5,716,435 A | 2/1998 | Aida et al. | |
| 6,379,451 B1 | 4/2002 | Kitamura et al. | |
| 6,916,862 B2 * | 7/2005 | Ota | C09B 67/0002 523/160 |
| 2009/0233059 A1 * | 9/2009 | Ota | C09D 11/322 428/195.1 |
| 2010/0285287 A1 * | 11/2010 | Matsuyama | C09B 67/0033 428/207 |
| 2010/0292323 A1 * | 11/2010 | Fujii | A01N 53/00 514/521 |
| 2014/0002539 A1 * | 1/2014 | Goto | C09D 11/322 347/20 |
| 2016/0075879 A1 * | 3/2016 | Ikeda | C09B 56/005 8/641 |
| 2017/0088739 A1 | 3/2017 | Yamashita et al. | |
| 2019/0330487 A1 * | 10/2019 | Nishikawa | C09D 11/037 |

FOREIGN PATENT DOCUMENTS

| | | |
|---|---|---|
| EP | 1 010 736 A1 | 6/2000 |
| EP | 2 351 704 A1 | 8/2011 |
| EP | 3 272 721 A1 | 1/2018 |
| JP | H 08/127981 A * | 5/1996 |
| JP | 2000-290578 A | 10/2000 |
| JP | 2002-20673 A | 1/2002 |
| JP | 2008/038075 A * | 2/2008 |
| JP | 2010-111826 A | 5/2010 |
| JP | 2011-174007 A | 9/2011 |
| JP | 2016-175995 A | 10/2016 |
| WO | WO 2014/156758 A1 | 10/2014 |
| WO | WO 2016/148255 A1 | 9/2016 |

OTHER PUBLICATIONS

English translation of JP 2016/175995, Oct. 2016; 27 pages.*
English translation of JP 2010/111826, May 2010; 15 pages.*
English translation of JP 2011/174007, Sep. 2011; 26 pages.*
English translation of JP 2000/290578, Oct. 2000; 9 pages.*
English translation of JP 2008/038075, Feb. 2008; 25 pages.*
English translation of JPH 08/127981, May 1996; 35 pages.*
English translation of WO 2014/156758, Oct. 2014; 38 pages.*
Extended European Search Report dated Jan. 30, 2018, in European Patent Application No. 17196956.1.
Communication Pursuant to Article 94(3) EPC dated May 17, 2019, issued in European Patent Application No. 17 196 956.1.

* cited by examiner

*Primary Examiner* — Helene Klemanski
(74) *Attorney, Agent, or Firm* — Birch, Stewart, Kolasch & Birch, LLP

(57) ABSTRACT

A novel dispersant contains a specific acetylene glycol and/or a specific acetylene glycol ethoxylate in combination with a specific arylphenol compound. Even when added in a small amount, the dispersant rapidly disperses disperse dyes and pigments and moreover exhibits excellent wettability and antifoaming properties. Dispersions and ink compositions containing the dispersant are also disclosed.

17 Claims, No Drawings

DISPERSANT, DISPERSION, INK COMPOSITION, AND METHODS OF PREPARATION THEREOF

CROSS-REFERENCE TO RELATED APPLICATION

This non-provisional application claims priority under 35 U.S.C. § 119(a) on Patent Application No. 2016-212792 filed in Japan on Oct. 31, 2016, the entire contents of which are hereby incorporated by reference.

TECHNICAL FIELD

The present invention relates to a dispersant, and more particularly to a dispersant that can be used for dispersing a disperse dye or a pigment. The present invention also relates to a dispersion containing the dispersant, to an ink composition containing the dispersion, and to methods of preparing the dispersion and the ink composition.

BACKGROUND ART

Disperse dyes and pigments have hitherto been used as ink colorants. When disperse dyes and pigments are used in inks, the disperse dye or pigment must be dispersed in water in a finely divided form. But, disperse dyes and pigments are insoluble in water, and so a dispersant is important for rendering the disperse dye or pigment into a dispersed state and stably maintaining that dispersed state for a prolonged period of time. Nonionic surfactants, anionic surfactants and polymer surfactants have been proposed as such dispersants.

For example, JP-A 2000-290578 and JP-A 2002-020673 disclose the use of acetylene group-containing nonionic surfactants as pigment dispersants. However, although acetylene group-containing nonionic surfactants are excellent for the penetrating ability and foam-inhibiting ability of inks, they tend to have a poor dispersion performance; for example, dispersion takes a longer time than with other dispersants.

JP-A 2010-111826 discloses a pigment dispersion containing two or more types of dispersants selected from among sodium naphthalene sulfonate formalin condensates, polycarboxylic acid graft polymers and polyoxyethylene styrylphenyl ethers. Yet, given the high amount of dispersant addition relative to the pigment, there is room here too for improvement. Moreover, because foaming readily arises with the use of these dispersants, wetting agents and penetrants must be added for use in inkjet inks and the like.

The following are used as dispersants for disperse dyes and pigments: styrene-acrylic acid-alkyl acrylate copolymers (in WO 2014/156758), formalin condensates of naphthalenesulfonic acids (in JP-A H08-127981), and styrene-acrylic copolymers (in JP-A 2016-175995). However, when these polymer compounds are used as the dispersant, the high viscosity of the dispersion makes preparation difficult. Also, in cases where the dispersion has been rendered into an ink composition, there is also the drawback that the composition dries easily. In addition, JP-A 2011-174007 uses nonionic surfactants such as polyoxyalkylene alkyl ethers, but these have dispersion performances that fall short of what is desired.

SUMMARY OF THE INVENTION

It is therefore an object of the present invention to provide a dispersant which, even when added in a small amount, can disperse a disperse dye or pigment in a short time, and moreover is capable of exhibiting excellent wettability and antifoaming properties. Further objects of the invention are to provide a dispersion which includes such a dispersant and has an excellent dispersion stability, an ink composition which includes such a dispersion, and methods for preparing the dispersion and the ink composition.

As a result of intensive investigations, the inventors have made the surprising discovery that by using a dispersant which includes both an acetylenic surfactant and an arylphenol compound, even when the dispersant is added in only a small amount, excellent dispersibility, wettability and antifoaming properties are exhibited and the dispersion time can be shortened.

Accordingly, in one aspect, the invention provides a dispersant that includes:
(A) from 1 to 50 wt % of at least one compound selected from the group consisting of acetylene glycols of formula (1) below

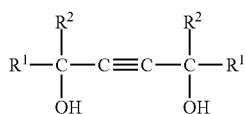

wherein $R^1$ and $R^2$ are each an alkyl group of 1 to 5 carbon atoms, and acetylene glycol ethoxylates of formula (2) below

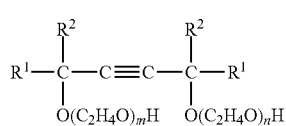

wherein $R^1$ and $R^2$ are each an alkyl group of 1 to 5 carbon atoms, and "m" and "n" are each positive number from 0.5 to 25 such that the sum m+n is from 1 to 40; and
(B) from 50 to 99 wt % of an arylphenol compound of formula (3) below

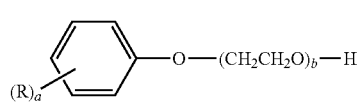

wherein "a" is an integer from 1 to 4, "b" is an integer from 1 to 30, and R is an aryl group. In formula (3), R is preferably a styryl, benzyl or cumyl group. This dispersant is preferably for dispersing a disperse dye or a pigment in an aqueous solvent.

In a second aspect, the invention provides a dispersion that includes the foregoing dispersant, a disperse dye and/or pigment, and an aqueous solvent.

In a third aspect, the invention provides an ink composition that includes the foregoing dispersion.

In a fourth aspect, the invention provides a method for preparing a dispersion, which method includes the step of mixing together and dispersing the foregoing dispersant, a disperse dye and/or pigment, and an aqueous solvent.

In a fifth aspect, the invention provides a method for preparing an ink composition, which method includes the steps of: preparing a dispersion by mixing together and dispersing the foregoing dispersant, a disperse dye and/or pigment, and an aqueous solvent; and mixing the dispersion with at least one substance selected from the group consisting of water, water-soluble organic solvents, resins, ultraviolet absorbers, antioxidants, pH adjustors, preservatives and viscosity modifiers.

ADVANTAGEOUS EFFECTS OF THE INVENTION

The dispersant of the invention, when added in a small amount, is capable of dispersing disperse dyes and pigments, and moreover can shorten the dispersion time. In addition, dispersions and ink compositions obtained using this dispersant exhibit excellent wettability, have little foamability, and exhibit good antifoaming properties and dispersion stability.

DESCRIPTION OF THE PREFERRED EMBODIMENTS

The objects, features and advantages of the invention will become more apparent from the following detailed description.

The dispersant of the invention includes: at least one compound selected from among acetylene glycols of formula (1) below and acetylene glycol ethoxylates of formula (2) below, which compound or compounds is referred to below as "component (A)"; and an arylphenol compound, referred to below as "component (B)."

The acetylene glycol of component (A) is a compound having formula (1) below.

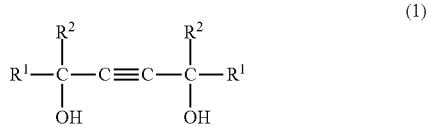
(1)

Here, $R^1$ and $R^2$ are each an alkyl group of 1 to 5 carbon atoms.

Examples of the acetylene glycol having formula (1) include 2,5,8,11-tetramethyl-6-dodecyn-5,8-diol, 5,8-dimethyl-6-dodecyn-5,8-diol, 2,4,7,9-tetramethyl-5-decyn-4,7-diol, 4,7-dimethyl-5-decyn-4,7-diol, 2,3,6,7-tetramethyl-4-octyn-3,6-diol, 3,6-dimethyl-4-octyn-3,6-diol and 2,5-dimethyl-3-hexyn-2,5-diol.

The acetylene glycol ethoxylate of component (A) is a compound having formula (2) below.

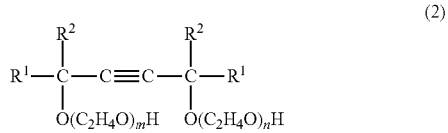
(2)

Here, $R^1$ and $R^2$ are each an alkyl group of 1 to 5 carbon atoms, and "m" and "n" are each positive numbers from 0.5 to 25, such that the sum m+n is from 1 to 40.

Examples of the acetylene glycol ethoxylate of formula (2) include ethylene oxide derivatives of the above acetylene glycols, such as the ethoxylate of 2,5,8,11-tetramethyl-6-dodecyn-5,8-diol (average value for m+n=6), the ethoxylate of 2,4,7,9-tetramethyl-5-decyn-4,7-diol (average value for m+n=10), the ethoxylate of 2,4,7,9-tetramethyl-5-decyn-4,7-diol (average value for m+n=4), and the ethoxylate of 3,6-dimethyl-4-octyn-3,6-diol (average value for m+n=4).

The number of added moles of ethylene oxide units in formula (2) (represented by the subscripts "m" and "n") is preferably from 0.5 to 25 moles each, and the total number of such added moles is preferably from 1 to 40 moles. At a total number of added moles of ethylene oxide in excess of 40 moles, the solubility in water rises and foamability increases, as a result of which the antifoaming effect decreases.

The acetylene glycol compound of component (A) may be used singly, or two or more may be used in admixture. The amount of component (A) included must be from 1 to 50 wt % of the overall dispersant, and is preferably from 3 to 35 wt %. When the content of component (A) is less than 1 wt %, the wettability with respect to disperse dyes and pigments is poor; when it is more than 50 wt %, the disperse dye or pigment dispersibility worsens.

The arylphenol compound serving as component (B) is a compound of formula (3) below.

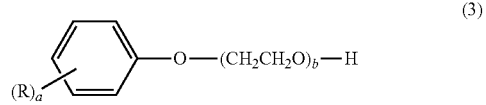
(3)

Here, "a" is an integer from 1 to 4, "b" is an integer from 1 to 30, and R is an aryl group. Exemplary aryl groups include styryl, benzyl, cumyl, naphthyl, phenyl and phenoxy groups. Styryl, benzyl and cumyl groups are preferred.

Illustrative examples of the arylphenol compound of formula (3) include styrylphenol compounds such as polyoxyethylene monostyrylphenyl ether, polyoxyethylene distyrylphenyl ether, polyoxyethylene tristyrylphenyl ether and polyoxyethylene tetrastyrylphenyl ether; benzylphenol compounds such as polyoxyethylene monobenzylphenyl ether, polyoxyethylene dibenzylphenyl ether and polyoxyethylene tribenzylphenyl ether; cumylphenol compounds such as polyoxyethylene cumylphenyl ether; and polyoxyethylene naphthylphenyl ether, polyoxyethylene biphenyl ether and polyoxyethylene phenoxyphenyl ether.

These may be used singly or as combinations of two or more thereof. Preferred examples are polyoxyethylene distyrylphenyl ether, polyoxyethylene tristyrylphenyl ether, polyoxyethylene dibenzylphenyl ether, polyoxyethylene tribenzylphenyl ether and polyoxyethylene cumylphenyl ether.

Here, the number b of polyoxyethylene group repeating units is an integer from 1 to 30, and preferably an integer from 15 to 30. When b is an integer of 1 or more, the compatibility with aqueous solvents and other additives is excellent. When b is an integer of not more than 30, the viscosity does not become too high.

The arylphenol compound is exemplified as follows. Styrylphenol compounds that may be used include commercial products such as the Noigen EA series from Dai-ichi Kogyo Seiyaku Co., Ltd., and TS-2000, TS-2600 and SM-174N from Toho Chemical Industry Co., Ltd. Benzylphenol compounds that may be used include commercial products such as Emulgen B-66 from Kao Corporation.

Cumylphenol compounds that may be used include commercial products such as Newcol CMP from Nippon Nyukazai Co., Ltd.

Component (B) is included in an amount which must be from 50 to 99 wt %, and is preferably from 65 to 97 wt %, of the overall dispersant. When the content of component (B) is less than 50 wt %, the dispersibility of the disperse dye or pigment worsens; when it is more than 99 wt %, the wettability with respect to disperse dyes and pigments becomes poor.

The dispersant of the invention can be obtained by mixing together components (A) and (B) via a known mixing preparation method that uses, for example, a propeller-type stirrer. In cases where such preparation is done using ingredients that are solid at room temperature, mixture under heating may be carried out if necessary.

The dispersion of the invention includes the above-described dispersant, a disperse dye and/or a pigment, and an aqueous solvent.

The ingredients making up this dispersion are described below.

In the dispersion of the invention, the dispersant content per 100 parts by weight of disperse dye and pigment is preferably from 1 to 100 parts by weight, more preferably from 3 to 50 parts by weight, and even more preferably from 5 to 20 parts by weight. When the dispersant content is too low, it may not be possible to fully disperse the disperse dye or pigment. On the other hand, when the dispersant content is too high, a large amount of dispersant that has not adsorbed to the disperse dye or pigment ends up being present within the dispersion, which is undesirable.

Known disperse dyes may be used without particular limitation as the disperse dye. Disperse dyes are compounds which are classified by chemical structure, such as benzene azo structures (monoazo, diazo), heterocyclic azo structures (e.g., thiazole azo, benzothiazole azo, pyridone azo, pyrazolone azo, thiophene azo) and condensed structures (quinophthalone, styryl, coumarin, etc.), and which have such characteristics as a poor solubility in water because they lack water-soluble groups and a molecular weight of not more than 2,000, which is small compared to other dyes.

Examples of disperse dyes that can be favorably used in the invention include the following:

yellow dyes such as C.I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218 and 224;

orange dyes such as C.I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139 and 142;

red dyes such as C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324 and 328;

violet dyes such as C.I. Disperse Violet 1, 4, 8, 23, 26, 27, 28, 31, 33, 35, 36, 38, 40, 43, 46, 48, 50, 51, 52, 56, 57, 59, 61, 63, 69 and 77;

green dyes such as C.I. Disperse Green 6:1 and 9;

brown dyes such as C.I. Disperse Brown 1, 2, 4, 9, 13 and 19;

blue dyes such as C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330 and 333; and black dyes such as C.I. Disperse Black 1, 3, 10 and 24.

Dyes available from Nippon Kayaku Co., Ltd. that can be favorably used include Kayaset Black K-R and A-N, Kayalon Polyester Black S-200, EX-SF 300, G-SF, BR-SF, 2B-SF 200, TA-SF 200 and AUL-S, Kayaset Yellow K-CL, Kayalon Polyester Yellow 4G-E, Kayalon Polyester Light Yellow 5G-S, Kayaset Red K-BL, Kayacelon Red E-BF, SMS-5, SMS-12, Kayalon Polyester Red TL-SF, BR-S, BL-E, HL-SF, 3BL-S200 and AUL-S, Kayalon Polyester Light Red B-S200, Kayalon Polyester Rubine BL-S200, Kayaset Blue N, K-FL and MSB-13, Kayalon Polyester Blue BR-SF and T-S, Kayalon Polyester Light Blue BGL-S200, Kayalon Polyester Turq Blue GL-S200 and Kayalon Polyester Blue Green FCT-S.

Dyes available from Orient Chemical Industries Co., Ltd. that can be favorably used include Valifast Black 3806, 3810 and 3820, Oil Black BS, BY, B-85 and 860, Water Yellow 6C, Valifast Yellow 1101, 1105, 3110, 3120, 4120 and 4126, Oplas Yellow 130 and 140, Oil Yellow GG-S, 105, 107, 129 and 818, Water Red 27, Valifast Red 1306, 1355, 2303, 3311 and 3320, Valifast Orange 3210, Valifast Brown 2402, Oil Red 5B, Oil Pink 312, Oil Brown BB, Valifast Blue 1601, 1603, 1605, 2606, 3806 and 3820, and Oil Blue #15, #613, 613, N14 and BOS.

Dyes available from Sumitomo Chemical Co., Ltd. that can be favorably used include Sumikaron Black S-BL, S-BF extra conc., S-RPD and S-XE 300%, Sumikaron Yellow SE-4G, SE-5G, SE-3GL conc. and SE-RPD, Sumikaron Brilliant Flavine S-10G, Sumikaron Red E-FBL, E-RPD(E) and S-RPD(S), Sumikaron Brilliant Red S-BF, S-BLF, SE-BL, SE-BGL, SE-2BF and SE-3BL(N), Sumikaron Red E-FBL, E-RPD(E) and S-RPD(S), Sumikaron Brilliant Red S-BF, S-BLF, SE-BL, SE-BGL, SE-2BF and SE-3BL(N), Sumikaron Brilliant Blue S-BL and Sumikaron Turquoise Blue S-GL and S-GLFgrain.

Dyes available from BASF that can be favorably used include Basacryl Black X-BGW, Neozapon Black X-51 and X-55, Neozapon Yellow 081, Lurafix Yellow 138, Zapon Blue 807, Neozapon Blue 807, Lurafix Blue 590 and 660, Orasol Black RLI, RL and CN, Oracet Yellow 8GF and GHS, Orasol Red G, Oracet Pink RP and Orasol Blue GL, GN and 2R.

Dyes available from Taoka Chemical Co., Ltd. that can be favorably used include Oleosol Fast Black AR and RL, Oleosol Fast Pink FB, Rhodamine A, B and B gran., Oleosol Fast Yellow 2G and Oleosol Fast Blue ELN.

Dyes available from Hodogaya Chemical Co., Ltd. that can be favorably used include Spilon Black BNH and MH special.

Dyes available from Mitsui Chemicals, Inc. that can be favorably used include PS Yellow GG, MS Yellow HD-180, PS Red G and MS Magenta VP.

Dyes available from Bayer that can be favorably used include Ceres Blue GN 01.

Dyes available from Sumika Color Co., Ltd. that can be favorably used include TS Yellow 118 cake, ESC Yellow 155, Sumiplast Yellow HLR and GC, TS Turq Blue 618 and 606, ESC Blue 655 and 660, and Sumiplast Blue S and OA.

Known pigments may be used without particular limitation as the pigment. Examples of organic pigments include azo pigments such as soluble azo pigments, insoluble azo pigments and condensed azo pigments; polycyclic pigments such as quinacridone pigments, perylene pigments, perynone pigments, isoindolinone pigments, isoindoline pigments, dioxazine pigments, thioindigo pigments, anthraquinone pigments, quinophthalone pigments, metal complex pigments and diketopyrrolopyrrole pigments; and phthalocyanine pigments. Examples of inorganic pigments include carbon black, metal oxides, metal hydroxides, metal sulfides, metal ferrocyanides and metal chlorides. Exemplary carbon blacks include furnace black, lamp black, acetylene black and channel black.

Specific examples of pigments include red pigments such as C.I. Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255 and 264; yellow pigments such as C.I. Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194 and 213; orange pigments such as C.I. Pigment Orange 36, 38 and 43; blue pigments such as C.I. Pigment Blue 15, 15:2, 15:3, 15:4, 15:6, 16, 22 and 60; green pigments such as C.I. Pigment Green 7, 36 and 58; violet pigments such as C.I. Pigment Violet 19, 23, 32 and 50; and black pigments such as C.I. Pigment Black 7.

Of these, preferred use can be made of, for example, C.I. Pigment Red 122, C.I. Pigment Yellow 74, 128 and 155, C.I. Pigment Blue 15:3, 15:4 and 15:6, C.I. Pigment Green 7 and 36, C.I. Pigment Violet 19 and C.I. Pigment Black 7.

With regard to the disperse dye and/or pigment included in the dispersion, the type, particle size, treatment method and the like may be suitably selected according to the intended purpose thereof. Also, the disperse dye and pigment included in the dispersion may be of a single type used alone or a plurality of two or more types may be used.

The concentration of disperse dye and pigment in the dispersion is preferably from 1 to 50 wt %, and more preferably from 5 to 50 wt %, per 100 wt % of the dispersion. When the concentration of disperse dye and pigment exceeds 50 wt %, the density of disperse dye and pigment in the dispersion becomes high and aggregation may occur because free movement is impeded.

Water and/or a water-soluble organic solvent may be used as the aqueous solvent. Two or more such solvents may be used in admixture. The water is preferably pure water or deionized water. Water-soluble organic solvents that may be used include alcohols such as methyl alcohol, ethyl alcohol, n-propyl alcohol, isopropyl alcohol, n-butyl alcohol, sec-butyl alcohol and tert-butyl alcohol; glycols such as ethylene glycol, propylene glycol, dipropylene glycol, butylene glycol, triethylene glycol, 1,2,6-hexanetriol, thiodiglycol, hexylene glycol and diethylene glycol; glycol ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether and triethylene glycol monobutyl ether; polyhydric alcohols such as glycerol; and nitrogen-containing compounds such as N-methyl-2-pyrrolidone, 2-pyrrolidone and 1,3-dimethyl-2-imidazolidinone. The proportion of water and water-soluble organic solvent in the dispersion is preferably from 5 to 95 wt %, and more preferably from 30 to 90 wt %, per 100 wt % of the dispersion.

The method for preparing the dispersion of the invention preferably includes in particular the step of mixing together and dispersing the above-described dispersant, disperse dye and/or pigment, and aqueous solvent. For example, the dispersion may be obtained by mixing together the dispersant, the disperse dye and/or pigment, and the aqueous solvent using a mixing and dispersing apparatus such as a paint shaker, bead mill, ball mill, dispersion mixer or kneader. In cases where ingredients that are solid at room temperature are used, mixture under heating may be carried out if necessary.

The dispersion has a viscosity of preferably not more than 10.0 mPa·s, and more preferably not more than 5.0 mPa·s. It is desirable for the lower limit in the dispersion viscosity to be at least 1.0 mPa·s. The viscosity is measured at 25° C.

The disperse dye and/or pigment in the dispersion has an average particle size of preferably not more than 300 nm, and more preferably not more than 150 nm. "Average particle size" refers here to the median diameter (D50).

The dispersion has a static surface tension that is preferably not more than 50 mN/m, and more preferably not more than 40 mN/m.

The foamability of the dispersion is preferably not more than 20 mL immediately after shaking, and more preferably not more than 10 mL.

The ink composition of the invention includes the above-described dispersion of the invention, and optionally includes also a resin and other additives. That is, the ink composition of the invention preferably includes (i) to (v) below:

(i) a dispersant,
(ii) a disperse dye and/or a pigment,
(iii) water and/or a water-soluble organic solvent,
(iv) a resin, and
(v) one or more additive selected from the group consisting of ultraviolet absorbers, antioxidants, pH adjustors, preservatives and viscosity modifiers.

The concentration of the disperse dye and/or pigment in the ink composition is preferably from 0.1 to 20 wt %, and more preferably from 0.1 to 10 wt %, per 100 wt % of the ink composition.

The proportion of water and/or water-soluble organic solvent in the ink composition is preferably from 50 to 99 wt %, and more preferably from 60 to 95 wt %, per 100 wt % of the ink composition.

The resin included in the ink composition is preferably a polymer having hydrophobic groups and hydrophilic groups. This polymer preferably has, as hydrophobic groups, at least one type of functional group selected from among alkyl groups, cycloalkyl groups and aryl groups. Also, it preferably has, as hydrophilic groups, at least one type of functional group selected from among carboxyl groups, sulfo groups, hydroxyl groups, amino groups and amide groups. Such polymers can be obtained by polymerizing monomers or oligomers having functional groups such as acryloyl, methacryloyl, vinyl or allyl groups. Examples of such monomers and oligomers that may be used include styrene, tetrahydrofurfuryl acrylate, butyl methacrylate, (α, 2, 3 or 4)-alkylstyrenes, (α, 2, 3 or 4)-alkoxystyrenes, 3,4-dimethylstyrene, α-phenylstyrene, divinylbenzene, vinylnaphthalene, dimethylamino (meth)acrylate, dimethylaminoethyl (meth)acrylate, dimethylaminopropyl acrylamide, N,N-dimethylaminoethyl acrylate, acryloyl morpholine, N,N-dimethyl acrylamide, N-isopropyl acrylamide, N,N-diethyl acrylamide, methyl (meth)acrylate, ethyl (meth) acrylate, propyl (meth)acrylate, ethylhexyl (meth)acrylate and other alkyl (meth)acrylates, methoxydiethylene glycol (meth)acrylate, (meth)acrylates of diethylene glycol or polyethylene glycol with ethoxy, propoxy or butoxy groups, cyclohexyl (meth)acrylate, benzyl (meth)acrylate, phenoxyethyl (meth)acrylate, isobornyl (meth)acrylate and hydroxyalkyl (meth)acrylates; and other acrylic or methacrylic group-containing compounds such as fluorine, chlorine or silicon-containing (meth)acrylates, (meth)acrylamide, maleic acid amide, (mono, di, tri, tetra or poly)ethylene glycol di(meth)acrylates in cases where a crosslinked structure is to be introduced in addition to the single function of (meth)acrylic acid, (meth)acrylates of 1,4-butanediol, 1,5-pentanediol, 1,6-hexanediol, 1,8-octanediol and 1,10-decanediol, trimethylolpropane tri(meth)acrylate, glycerol (di or tri) (meth)acrylate, di(meth)acrylates of ethylene oxide adducts of bisphenol A or F, neopentyl glycol di(meth)acrylate, pentaerythritol tetra(meth)acrylate and dipentaerythritol hexa(meth)acrylate.

The proportion of resin in the ink composition, although not particularly limited, is preferably from 0 to 30 wt %, and more preferably from 0 to 20 wt %, per 100 wt % of the ink composition. When a resin is included in the ink composition, the amount thereof is preferably set to at least 1 wt %.

In addition, various additives may be included in the ink composition. Exemplary additives include ultraviolet absorbers, antioxidants, pH adjustors, preservatives and viscosity modifiers. These may be suitably selected and included in the ink composition. Such additives may be included within the balance of the 100 wt % of the dispersion and ink composition aside from the disperse dye and/or pigment, the water and/or water-soluble organic solvent and the resin, and more specifically in a proportion of from 0 to 10 wt % per 100 wt % of the ink composition.

The method used to prepare the ink composition, although not particularly limited, is preferably a method that includes the step of preparing a dispersion by mixing together and dispersing the above-described dispersant, disperse dye and/or pigment, and aqueous solvent; and the step of mixing the dispersion with at least one substance selected from the group consisting of water, water-soluble organic solvents, resins, ultraviolet absorbers, antioxidants, pH adjustors, preservatives and viscosity modifiers.

The ink composition is applied onto a recording medium by an inkjet recording method, a recording method involving the use of a writing implement such as a pen, or some other printing method. It is especially preferable to use the ink composition of the invention in an inkjet recording method.

EXAMPLES

The following Examples and Comparative Examples are provided to illustrate the invention, and are not intended to limit the scope thereof. In the Examples below, unless noted otherwise, all references to parts and percent (%) are by weight.

Working Example 1

A plastic vessel (made of polypropylene and having a capacity of 0.5 L) was charged with 15 parts of the red disperse dye PS Red G (Mitsui Chemicals, Inc.; C.I. Disperse Red 60), 83.35 parts of deionized water and 0.1 part of dipropylene glycol as the aqueous solvents, 0.05 part of compound (A-1) as component (A), 1.5 parts of compound (B-1) as component (B), and 232 parts of glass beads (diameter, 1 mm), following which the vessel contents were dispersed for 0.5 hour, 1 hour, 3 hours or 5 hours using the PAINT SHAKER from Asada Iron Works Co., Ltd. Following dispersion, the glass beads were filtered off, giving a dispersion.

Working Examples 2 to 7, Comparative Examples 1 to 5

Dispersions having the compositions shown in Table 1 were prepared in the same way as in Working Example 1.

The viscosity, average particle size, surface tension, foamability and dispersion stability for each dispersion were measured by the following methods. The results are presented in Table 1 below.

Viscosity

The viscosity (25° C.) at various dispersion times was measured using the TVE-20 E viscometer (from Toki Sangyo Co., Ltd.). It is desirable for the viscosity to not rise even when the dispersion time is long.

Average Particle Size

The average particle size (D50) at various dispersion times was measured using the FPAR-1000 particle size analyzer for concentrated systems (Otsuka Electronics Co., Ltd.). Having the particle size become small in a short period of time is desirable because it is thought that dispersion in a short time will then be possible.

Surface Tension

The static surface tension was measured at various dispersion times using the DY-500 High-Performance Surface Tensiometer (Kyowa Interface Science Co., Ltd.). It is desirable for the static surface tension to be maintainable even when the dispersion time is long.

Foamability

A 100 mL graduated cylinder was used to measure out 20 mL of dispersion that had been dispersed for 5 hours and a cover was placed on top of the graduated cylinder, after which the cylinder was set in the KM Shaker (Iwaki Sango KK) and shaken for 1 minute under the following conditions: shaking stroke, 4 cm; speed, 360 rpm. The foamability (mL) was evaluated by visually reading off the amount of generated foam immediately after the end of shaking.

Dispersion Stability

The dispersion stability of a dispersion that was dispersed for 5 hours was evaluated using the LUMiSizer® dispersion stability analyzer (LUM GmbH). This analysis was performed at a temperature of 25° C. and a speed of 2,000 rpm for an analysis time of 1 hour 30 minutes, and the rate of boundary movement (rate of particle sedimentation) was measured. At a small boundary movement rate, the dispersion stability is good.

TABLE 1

| | | Working Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| Component (A) | A-1 | 0.05 | | 0.05 | 0.05 | 0.05 | | | | | | | |
| | A-2 | | 0.75 | | | | | 0.35 | | | | | |
| | A-3 | | | | | | 0.07 | | | | | | |
| Component (B) | B-1 | 1.5 | 1.5 | | | | | | 1.5 | | | | |
| | B-2 | | | 1.5 | | | | | | 1.5 | | | |
| | B-3 | | | | 1.5 | | | | | | 1.5 | | |
| | B-4 | | | | | 1.5 | | | | | | 1.5 | |
| | B-5 | | | | | | 0.75 | 0.75 | | | | | 0.75 |
| Disperse dye | PS Red G | 15 | 15 | 15 | 15 | 15 | 15 | 15 | 15 | 15 | 15 | 15 | 15 |
| Aqueous solvent | water | 83.35 | 82.75 | 83.35 | 83.35 | 83.35 | 84.18 | 83.9 | 83.5 | 83.5 | 83.5 | 83.5 | 84.25 |
| | dipropylene glycol | 0.1 | | 0.1 | 0.1 | 0.1 | | | | | | | |
| Viscosity (mPa·s) | 0.5 hour | 1.6 | 1.7 | 1.6 | 1.6 | 1.6 | 1.6 | 1.5 | 1.6 | 1.6 | 1.7 | 1.6 | 1.7 |
| | 1 hour | 1.5 | 1.6 | 1.5 | 1.5 | 1.6 | 1.6 | 1.5 | 1.5 | 1.6 | 1.7 | 1.6 | 1.7 |
| | 3 hours | 1.6 | 1.7 | 1.6 | 1.5 | 1.6 | 1.6 | 1.5 | 1.5 | 1.5 | 1.6 | 1.5 | 1.7 |
| | 5 hours | 1.6 | 1.7 | 1.6 | 1.7 | 1.7 | 1.6 | 1.5 | 1.7 | 1.6 | 1.7 | 1.7 | 1.7 |
| Average particle size (nm) | 0.5 hour | 390 | 481 | 521 | 225 | 223 | 390 | 411 | 429 | 875 | 319 | 301 | 543 |
| | 1 hour | 247 | 424 | 200 | 177 | 180 | 297 | 285 | 424 | 566 | 207 | 204 | 365 |
| | 3 hours | 140 | 167 | 124 | 148 | 161 | 100 | 96 | 195 | 167 | 173 | 168 | 169 |
| | 5 hours | 124 | 161 | 111 | 136 | 127 | 98 | 96 | 151 | 134 | 140 | 149 | 138 |
| Surface tension (mN/m) | 0.5 hour | 35.8 | 28.5 | 35.3 | 34.7 | 34.3 | 32.3 | 30.3 | 49.1 | 45.3 | 61.6 | 62.2 | 55.6 |
| | 1 hour | 36.0 | 28.4 | 35.4 | 35.1 | 34.9 | 32.9 | 30.4 | 48.3 | 47.2 | 47.2 | 42.3 | 56.3 |
| | 3 hours | 37.0 | 28.7 | 36.0 | 35.8 | 36.4 | 34.6 | 31.5 | 37.0 | 43.5 | 47.4 | 48.0 | 56.9 |
| | 5 hours | 37.1 | 26.1 | 36.4 | 37.1 | 36.8 | 35.2 | 32.9 | 37.1 | 44.4 | 54.8 | 48.4 | 57.2 |
| Foamability (mL) | | 5 | 5 | 5 | 5 | 5 | 10 | 5 | 30 | 40 | 30 | 40 | 30 |
| Dispersion stability [boundary movement rate, μm/s] | | 1.53 | 1.54 | 1.53 | 1.51 | 1.55 | 1.47 | 1.49 | 2.32 | 2.35 | 2.36 | 2.29 | 2.33 |

Details on components (A) and (B) in the above table are given below.
(A-1): 2,5,8,11-Tetramethyl-6-dodecyn-5,8-diol
(A-2): Ethoxylate of 2,4,7,9-tetramethyl-5-decyn-4,7-diol (average value for m + n in formula (2) is 4)
(A-3): Ethoxylate of 2,5,8,11-tetramethyl-6-dodecyn-5,8-diol (average value for m + n in formula (2) is 4)
(B-1): Styrylphenol compound having average value for "a" in formula (3) of 3, and average value for "b" of 23
(B-2): Styrylphenol compound having average value for "a" in formula (3) of 3, and average value for "b" of 17
(B-3): Styrylphenol compound having average value for "a" in formula (3) of 3, and average value for "b" of 28
(B-4): Styrylphenol compound having average value for "a" in formula (3) of 2, and average value for "b" of 17
(B-5): Benzylphenol compound having average value for "a" in formula (3) of 3, and average value for "b" of 15

Japanese Patent Application No. 2016-212792 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dispersion comprising
a dispersant,
a disperse dye or pigment or both, and
an aqueous solvent,
wherein the dispersant comprises:
(A) from 1 to 50 wt % of at least one compound selected from the group consisting of acetylene glycols of formula (1) below

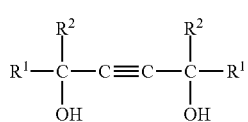
(1)

wherein $R^1$ and $R^2$ are each an alkyl group of 1 to 5 carbon atoms, and acetylene glycol ethoxylates of formula (2) below

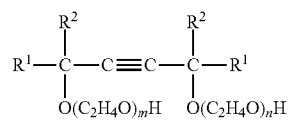
(2)

wherein $R^1$ and $R^2$ are each an alkyl group of 1 to 5 carbon atoms, and "m" and "n" are each a positive number from 0.5 to 25 such that the sum m+n is from 1 to 40; and (B) from 50 to 99 wt % of an arylphenol compound of formula (3) below

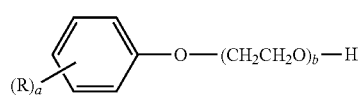
(3)

wherein "a" is an integer of 3 or 4, "b" is an integer from 15 to 30, and R is a styryl, benzyl or cumyl group, and wherein the aqueous solvent is water and/or a water-soluble organic solvent selected from the group consisting of methyl alcohol, ethyl alcohol, n-propyl alcohol, isopropyl alcohol, n-butyl alcohol, sec-butyl alcohol, tert-butyl alcohol, propylene glycol, dipropylene glycol, butylene glycol, triethylene glycol, 1,2,6-hexanetriol, thiodiglycol, hexylene glycol, diethylene glycol, ethylene glycol monomethyl ether, ethylene glycol monoethyl ether, diethylene glycol methyl ether, diethylene glycol ethyl ether, triethylene glycol monomethyl ether, triethylene glycol monoethyl ether, triethylene glycol monobutyl ether, and 1,3-dimethyl-2-imidazolidinone.

2. The dispersion of claim 1, wherein the amount of component (A) is from 3 to 35 wt % and the amount of component (B) is included from 65 to 97 wt %, of the overall the dispersant.

3. The dispersion of claim 1, wherein the aqueous solvent is water or a combination of water and dipropylene glycol.

4. The dispersion of claim 1, wherein the acetylene glycol of formula (1) is selected from the group consisting of: 2,5,8,11-tetramethyl-6-dodecyn-5,8-diol; 5,8-dimethyl-6-dodecyn-5,8-diol; 2,4,7,9-tetramethyl-5-decyn-4,7-diol; 4,7-dimethyl-5-decyn-4,7-diol; 2,3,6,7-tetramethyl-4-octyn-3,6-diol; 3,6-dimethyl-4-octyn-3,6-diol; 2,5-dimethyl-3-hexyn-2,5-diol; and mixtures thereof.

5. The dispersion of claim 1, wherein the acetylene glycol of formula (2) is selected from the group consisting of: the ethoxylate of 2,5,8,11-tetramethyl-6-dodecyn-5,8-diol (average value for m+n=6); the ethoxylate of 2,4,7,9-tetramethyl-5-decyn-4,7-diol (average value for m+n=10); the ethoxylate of 2,4,7,9-tetramethyl-5-decyn-4,7-diol (average value for m+n=4); the ethoxylate of 3,6-dimethyl-4-octyn-3,6-diol (average value for m+n=4); and mixtures thereof.

6. The dispersion of claim 1, wherein the amount of component (A) is from 3 to 35 wt. %.

7. The dispersion of claim 1, wherein the arylphenol compound of formula (3) is selected from the group consisting of: polyoxyethylene tristyrylphenyl ether; polyoxyethylene tetrastyrylphenyl ether; polyoxyethylene tribenzylphenyl ether; and mixtures thereof.

8. The dispersion of claim 1, wherein the amount of component (B) is from 65 to 97 wt. %.

9. The dispersion of claim 1, wherein the amount of dispersant content is from 3 to 50 parts by weight.

10. The dispersion of claim 1, wherein the amount of dispersant content is from 5 to 20 parts by weight.

11. The dispersion of claim 1, wherein the dispersion has a viscosity of not more than 10.0 mPa·s when measured at 25° C.

12. The dispersion of claim 1, wherein the disperse dye and/or pigment have an average median diameter ($D_{50}$) particle size of not more than 300 nm.

13. The dispersion of claim 1, wherein the dispersion has a static surface tension that is not more than 50 mN/m.

14. The dispersion of claim 1, wherein the foamability of the dispersion is not more than 20 mL immediately after shaking.

15. A method for preparing the dispersion of claim 1, comprising the step of mixing together and dispersing the dispersant, the disperse dye or pigment or both, and the aqueous solvent.

16. An ink composition comprising the dispersion of claim 1.

17. A method for preparing an ink composition, comprising the steps of:
mixing the dispersion of claim 1 with at least one substance selected from the group consisting of water, water-soluble organic solvents, resins, ultraviolet absorbers, antioxidants, pH adjustors, preservatives and viscosity modifiers.

* * * * *